United States Patent
Koyama et al.

(10) Patent No.: US 7,787,228 B2
(45) Date of Patent: Aug. 31, 2010

(54) SWITCHGEAR CONTROL APPARATUS

(75) Inventors: Haruhiko Koyama, Tokyo (JP); Tomohito Mori, Tokyo (JP); Kenji Kamei, Tokyo (JP); Sadayuki Kinoshita, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 438 days.

(21) Appl. No.: 11/873,076

(22) Filed: Oct. 16, 2007

(65) Prior Publication Data
US 2008/0164962 A1    Jul. 10, 2008

(30) Foreign Application Priority Data
Nov. 28, 2006    (JP)   .............................. 2006-319551

(51) Int. Cl.
    *H02H 7/00*     (2006.01)
(52) U.S. Cl. ....................................................... 361/78
(58) Field of Classification Search .................... 361/78
See application file for complete search history.

(56) References Cited

U.S. PATENT DOCUMENTS

| | | | |
|---|---|---|---|
| 5,479,086 A | | 12/1995 | Konstanzer |
| 5,563,459 A | * | 10/1996 | Kurosawa et al. ........ 307/141.4 |
| 6,172,863 B1 | * | 1/2001 | Ito et al. ....................... 361/79 |
| 6,392,390 B1 | | 5/2002 | Ito et al. |
| 6,493,203 B1 | * | 12/2002 | Ito et al. ..................... 361/159 |
| 7,336,461 B2 | * | 2/2008 | Dupraz et al. ................. 361/71 |
| 2006/0018068 A1 | | 1/2006 | Kinoshita et al. |

FOREIGN PATENT DOCUMENTS

| | | |
|---|---|---|
| CN | 1258086 A | 6/2000 |
| DE | 976192 | 5/1963 |
| DE | 4307291 | 11/1993 |
| DE | 19882678 | 8/2000 |
| WO | WO 00/04564 A1 | 1/2000 |

OTHER PUBLICATIONS

Chinese Office Action, dated Jan. 8, 2010.
Office Action dated Jan. 25, 2010 in corresponding German Patent Application No. 10 2007 057 236.2-32, and an English-language translation, 6 pages.
Lee et al, "A Method to Decide the Switching Instants of Controlled Switching Circuit Breaker for Shunt Reactors", Transmission and Distribution Conference and Exhibition 2002: Asian Pacific, IEEE/PES< vol. 3, Oct. 6-10, 2002, pp. 1760-1765.

* cited by examiner

*Primary Examiner*—Stephen W Jackson
(74) *Attorney, Agent, or Firm*—Buchanan Ingersoll & Rooney PC

(57) ABSTRACT

A switchgear control apparatus includes main contacts for first to third phases, operating mechanisms for activating the main contacts for the respective phases, voltage sensors for detecting phase voltages of a three-phase power source, and a contact closing control circuit. The contact closing control circuit first outputs a contact closing signal to the first-phase operating mechanism to close the first-phase main contact corresponding to a central leg of a core of a three-phase reactor at a first-phase voltage peak, and then a contact closing signal to the second- and third-phase operating mechanisms to simultaneously close the second- and third-phase main contacts corresponding to two outer legs of the reactor core at a zero-voltage point of the first phase three-quarter cycle later than close of the main contact for the first phase.

3 Claims, 4 Drawing Sheets

SWITCHGEAR CONTROL APPARATUS

BACKGROUND OF THE INVENTION

1. Field of the Invention

The present invention relates to a switchgear control apparatus for controlling opening/closing operation of each circuit breaker of a switchgear for connecting a three-phase reactor having a three-phase core to a three-phase AC power source and, more particularly, the invention is concerned with a technique for suppressing inrush currents which may occur when the three-phase reactor is energized.

2. Description of the Background Art

Conventionally, a controlled switching technique is used for suppressing inrush currents which can occur when a three-phase reactor is energized. For example, PCT International Patent Application Republication No. WO0004564 discloses as a fifth embodiment thereof a switchgear control apparatus for suppressing excitation inrush currents. Specifically, when supplying a source voltage to a shunt reactor having a three-phase core and star-connected windings whose neutral point is grounded, the switchgear control apparatus suppresses the excitation inrush currents by first supplying the source voltage to a first phase (R phase) at a point where a first-phase voltage is at a maximum and then supplying the source voltage to second and third phases (S and T phases), thereby preventing transient phenomena.

In the conventional controlled switching technique, a target phase angle at which a voltage to each phase of a three-phase reactor is supplied is determined on the assumption that residual magnetic flux in a reactor core is at zero level. In practice, however, a slight amount of residual magnetic flux remains in the reactor core. In addition, as the residual magnetic flux reaches maximum levels randomly in the three-phase reactor core of the individual phases, the conventional controlled switching technique is not effective enough in suppressing the inrush currents.

SUMMARY OF THE INVENTION

The present invention is intended to provide a solution to the aforementioned problem of the prior art. More particularly, it is an object of the invention to provide a switchgear control apparatus having a capability to effectively suppress inrush currents which may occur when a three-phase reactor is energized taking into consideration the presence of residual magnetic flux.

According to the invention, a switchgear control apparatus controls close operation of a switchgear for connecting a three-phase reactor having a three-phase core to a three-phase power source. The switchgear control apparatus includes main contacts for individual phases of the switchgear, operating mechanisms for the individual phases having a capability to independently activate the main contacts for the individual phases, voltage sensors for detecting individual phase voltages of the three-phase power source, and a contact closing control circuit. The contact closing control circuit first outputs a contact closing signal to the operating mechanism for a first phase so that the main contact for the first phase corresponding to a central leg of the three-phase core is closed at a point in time of a first-phase voltage peak detected by the voltage sensor for the first phase and then outputs a contact closing signal to the operating mechanisms for second and third phases so that the main contacts for the second and third phases corresponding to two outer legs of the three-phase core are closed at a zero-voltage point of the first phase detected by the voltage sensor for the first phase according to a contact closing command.

The switchgear control apparatus of the invention is configured to first close the main contact for the first phase corresponding to the central leg of the three-phase core at a point in time of a first-phase voltage peak. Magnetic flux produced in the central leg of the three-phase core by energization of the first phase branches out in halves and is routed almost equally into the two outer legs, and residual magnetic fluxes in the second- and third-phase legs equally decrease before energization of the second and third phases. This arrangement of the present invention serves to suppress inrush currents in the three phases as a whole.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

First Embodiment

Figure 1:
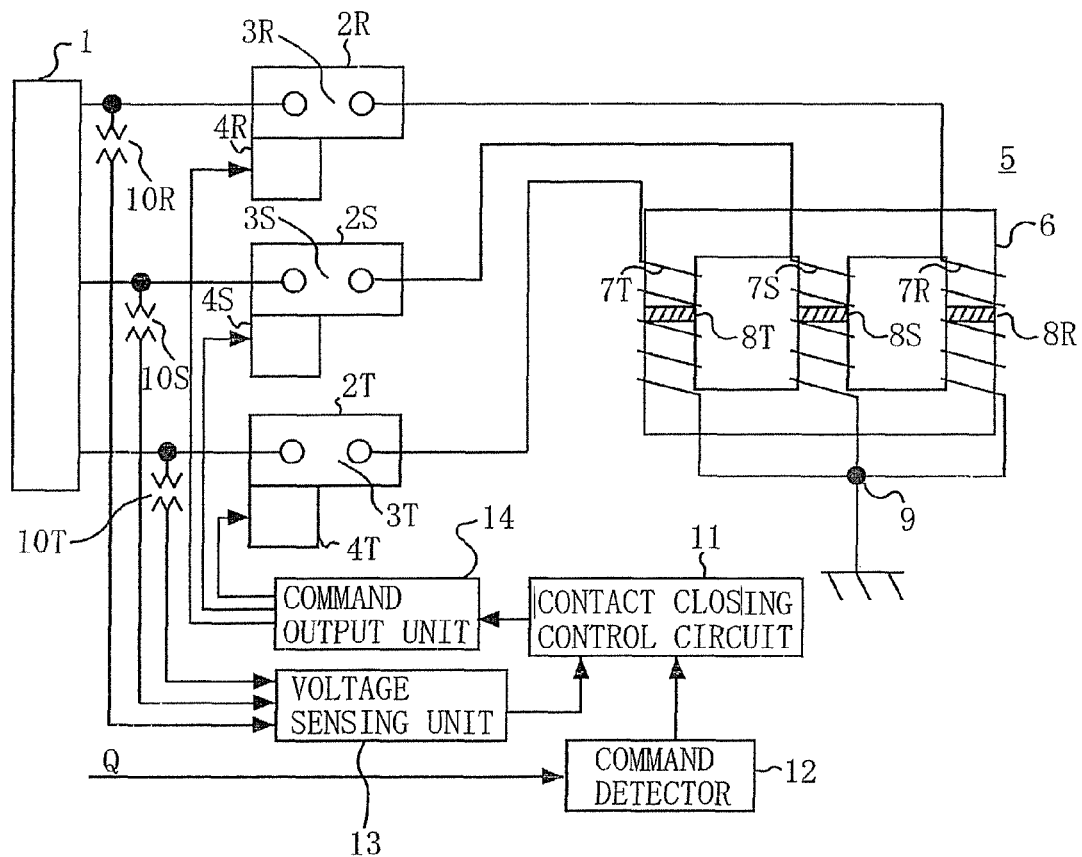
FIG. 1 is a diagram showing the configuration of a power system including a switchgear control apparatus according to a first embodiment of the invention.

FIG. 1 is a diagram showing the configuration of a power system including a switchgear control apparatus according to a first embodiment of the invention. Referring to FIG. 1, a three-phase power source 1 is connected to a three-phase reactor 5 via respective circuit breakers 2R, 2S, 2T which may be opened and closed for disconnecting the three-phase reactor 5 from the three-phase power source 1 and connecting the three-phase reactor 5 to the three-phase power source 1. The circuit breakers 2R, 2S, 2T of individual phases (indicated by R, S and T) are provided with main contacts 3R, 3S, 3T for interrupting and flowing main circuit currents through the circuit breakers 2R, 2S, 2T and operating mechanisms 4R, 4S, 4T for causing the main contacts 3R, 3S, 3T to make and break, respectively.

The three-phase reactor 5 includes a three-leg core 6 which is configured with magnetic gaps 8R, 8S, 8T created in legs of the individual phases as well as windings 7R, 7S, 7T wound on the respective legs of the three-leg core 6, the windings 7R, 7S, 7T being joined at one end to a grounded common neutral point 9.

Voltage sensors 10R, 10S, 10T detect individual phase voltages of the three-phase power source 1 and deliver the detected voltages to a contact closing control circuit 11 through a voltage sensing unit 13.

Upon receiving a command Q concerning close of the circuit breakers 2R, 2S, 2T through a command detector 12, the contact closing control circuit 11 determines close times of the circuit breakers 2R, 2S, 2T for the individual phases by performing later discussed processing operation and outputs the close times to the respective operating mechanisms 4R, 4S, 4T through a command output unit 14.

Now, the working of the contact closing control circuit 11, that is, contact close phase control operation of the switchgear control apparatus of the first embodiment, is described.

Figure 2:
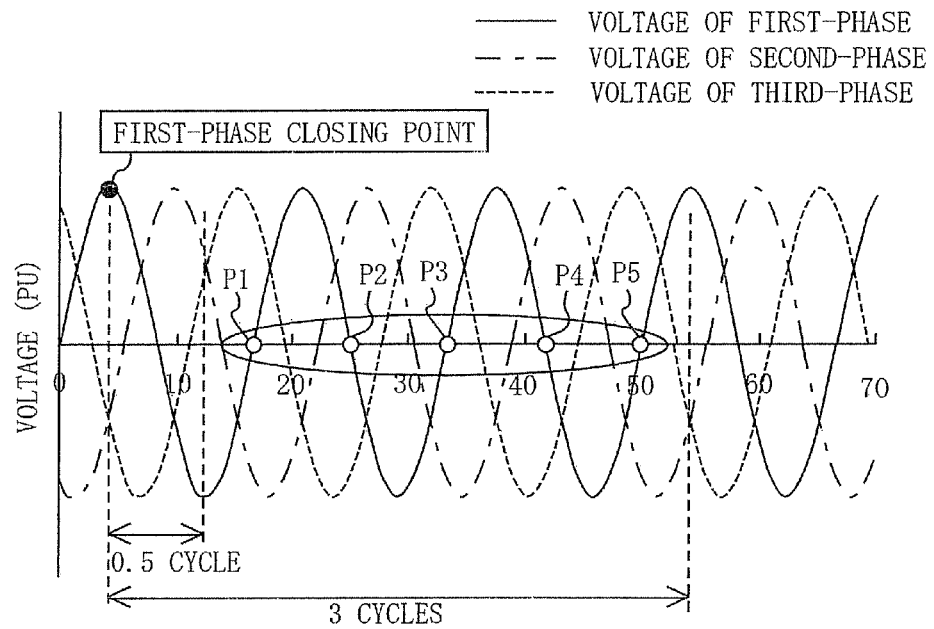
FIG. 2 is a diagram showing waveforms of the individual phase voltages of a three-phase power source and desirable closing points.

FIG. 2 is a diagram showing waveforms of the individual phase voltages of the three-phase power source 1 detected by the voltage sensors 10R, 10S, 10T as well as desirable closing points, or contact closing phase angles, obtained with the present invention. In the following discussion, the expression "first phase" (shown by a solid line) refers to a phase which is first energized and the expressions "second phase" (shown by an alternate long and short dashed line) and "third phase" (shown by a broken line) refer to the other two phases which are simultaneously energized in succession to the first phase.

As will be later explained in greater detail, the first phase is a phase corresponding to a central leg of the three-leg core 6 in the present invention, and a first-phase closing point lies at a point in time of a voltage peak (or a voltage peak point) as can be seen from FIG. 2. A source voltage is supplied to the first phase at the voltage peak point in order to suppress a transient component of magnetic flux which is represented by an integral value of the voltage in a conventionally known fashion. Expressed with reference to FIG. 1, energizing the first phase is to close the main contact 3S of the circuit breaker 2S which is connected to the winding 7S wound around the central leg of the three-leg core 6.

Reverting to FIG. 2, designated by P1 to P5 are candidates for a common second-and-third-phase closing point. These candidates are at zero-voltage points in time of the first phase existing at half-cycle intervals within a range of 0.5 to 3 cycles from the first-phase closing point. DC components of residual magnetic flux in the second- and third-phase legs (first and second outer legs) of the three-leg core 6 attenuate with the lapse of time after the first phase is energized. The switchgear control apparatus energizes the second and third phases after waiting for attenuation of the residual magnetic flux in the two outer legs in order to suppress inrush currents potentially occurring at energization of the second and third phases. This is why the second and third phases are energized at a point one-half or more cycles later than the first-phase closing point. On the other hand, if the second and third phases are energized with too large a delay time from the first-phase closing point, a problem may occur in power system operation. The switchgear control apparatus sets a limit to the time delay in energizing the second and third phases to rule out the possibility of such a problem in power system operation. This is why the second and third phases are energized within 3 cycles from the first-phase closing point. Therefore, if suppression of inrush currents is an only matter of importance one should care about, it is not essentially needed to set an upper limit on the time delay in energizing the second and third phases.

Described in the following are results of a comparison of inrush currents calculated with a variety of simulated contact closing conditions including those used in the earlier-mentioned conventional controlled switching technique. In the following discussion, the level of residual magnetic flux in each leg of the three-leg core 6 is expressed in terms of per unit (pu) referenced to a rated magnetic flux level of 1.0 pu during steady-state operation. Here, it is assumed that, residual magnetic flux of 0.1 pu is left in one phase and residual magnetic flux of 0.05 pu is left in each of the other two phases, the residual magnetic flux in the latter two phases having a polarity opposite to that of the residual magnetic flux in the former one phase.

Figure 3:
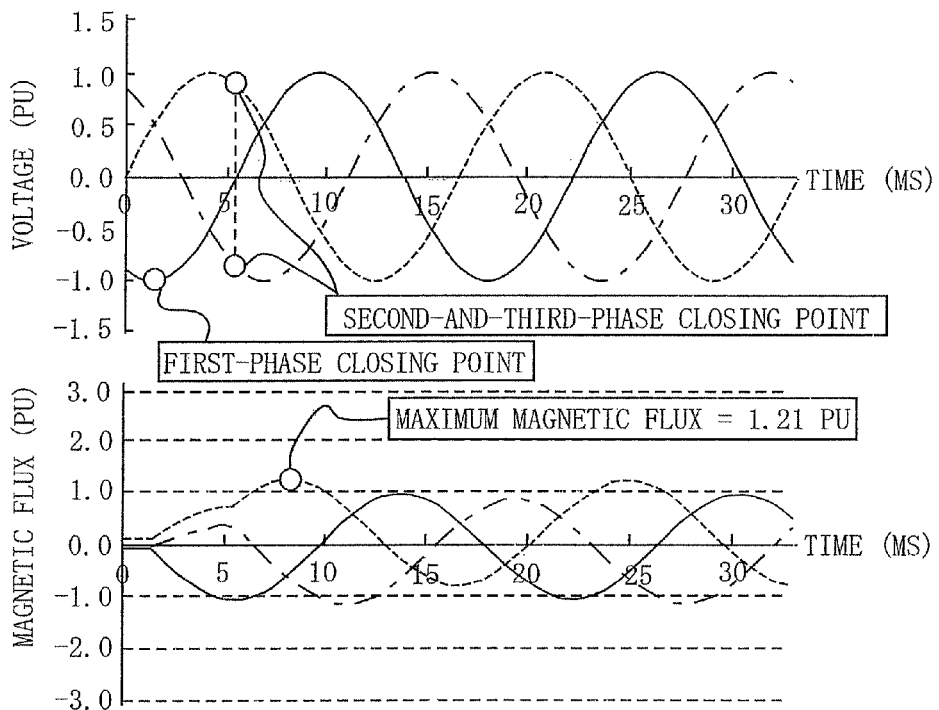
FIG. 3 is a diagram showing simulated voltage and magnetic flux waveforms of individual phases at energization of a three-phase reactor by use of a conventional switchgear control apparatus.

FIG. 3 is a diagram showing results of simulation with the earlier-mentioned switchgear control apparatus of PCT International Patent Application Republication No. WO0004564, an upper half of FIG. 3 showing simulated voltage waveforms of the individual phases and a lower half of FIG. 3 showing simulated magnetic flux waveforms of the individual phases. As depicted in FIG. 3, the first phase is the phase of a first outer leg of the three-phase reactor, the second phase is the phase of a second outer leg of the three-phase reactor, and the third phase is the phase of a central leg of the three-phase reactor. Here, it is assumed that, residual magnetic flux in the first phase is −0.05 pu, residual magnetic flux in the second phase is −0.05 pu, and residual magnetic flux in the third phase is +0.1 pu.

Referring to FIG. 3, the conventional switchgear control apparatus energizes the first phase at a negative voltage peak point thereof (first-phase closing point) and then the second and third phases at a zero-voltage point of the first phase a quarter cycle later than the negative voltage peak point of the first phase. As can be seen from the lower half of FIG. 3, the magnetic flux in the first outer leg increases in level in a negative direction as a result of energization of the first phase. This magnetic flux in the first outer leg branches out and is routed into the central leg and the second outer leg. When viewed from the first outer leg, the central leg has lower reluctance for the magnetic flux than the second outer leg, so that a much greater part of the magnetic flux in the first outer leg than half the amount of the magnetic flux is routed into the central leg.

Therefore, the residual magnetic flux in the central leg reaches a high level when the third phase is energized. This is reflected in the results of simulation depicted in FIG. 3, where the magnetic flux in the central leg reaches a maximum magnetic flux level of 1.21 pu as a result of energization of the third phase. This level of magnetic flux is higher than observed in the switchgear control apparatus of the present invention.

Figure 4:
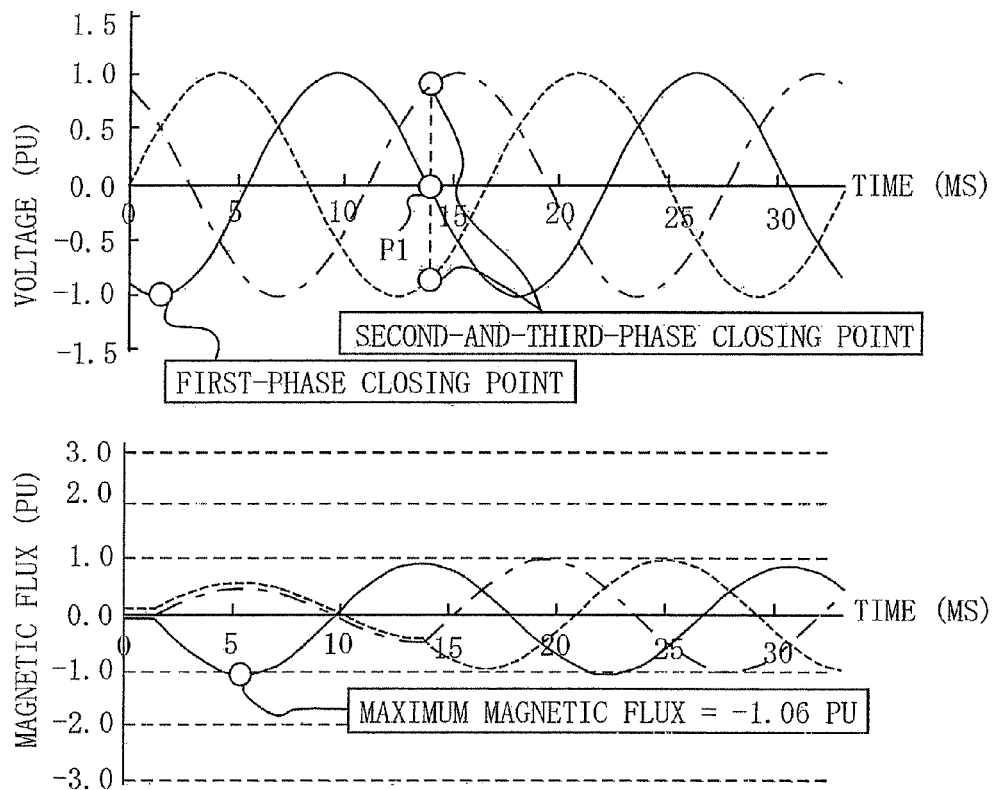
FIG. 4 is a diagram showing simulated voltage and magnetic flux waveforms of individual phases at energization of a three-phase reactor according to the first embodiment of the invention.

FIG. 4 is a diagram showing results of simulation with the switchgear control apparatus of the first embodiment, an upper half of FIG. 4 showing simulated voltage waveforms of the individual phases and a lower half of FIG. 4 showing simulated magnetic flux waveforms of the individual phases. As depicted in FIG. 4, the first phase is the phase of the central leg of the three-leg core 6, the second phase is the phase of the first outer leg of the three-leg core 6, and the third phase is the phase of the second outer leg of the three-leg core 6. Here, it is assumed that, residual magnetic flux in the central leg is −0.05 pu, residual magnetic flux in the first outer leg is −0.05 pu, and residual magnetic flux in the second outer leg is +0.1 pu.

Referring to FIG. 4, the switchgear control apparatus of the first embodiment energizes the first phase at a negative voltage peak point thereof (first-phase closing point) as in the case of FIG. 3. Subsequently, the switchgear control apparatus of the first embodiment energizes the second and third phases at a zero-voltage point of the first phase three-quarter cycle later than the negative voltage peak point of the first phase, that is, at least one-half cycle later than the negative voltage peak point of the first phase. As can be seen from the lower half of FIG. 4, the residual magnetic flux in the central leg of the three-leg core 6 carrying the first phase and magnetic flux increasing in the central leg as a result of application of the source voltage to the first phase have a common polarity (negative), so that total magnetic flux in the central leg reaches a maximum magnetic flux level of −1.06 pu. On the other hand, the first and second outer legs of the three-leg core 6 carrying respectively the second and third phases have the same magnetic relationship with the central leg and, thus, the magnetic flux produced in the central leg branches out in halves and is routed almost equally into the first and second outer legs. It follows that the magnetic flux produced in the central leg as a result of energization of the first phase is not routed too much into one of the other two legs, unlike the case of the conventional switchgear control apparatus depicted in FIG. 3.

In addition, since the second and third phases are energized at the point three-quarter cycle later than the first-phase closing point, that is, at least one-half cycle later than the first-phase closing point, DC components of the residual magnetic flux in the second- and third-phase legs (first and second outer legs) of the three-leg core 6 attenuate up to a point where the DC components disappear almost entirely. As a consequence, the magnetic flux in each of the first and second outer legs has a level approximately half the level of the magnetic flux in the first-phase central leg at the second-and-third-phase closing point. This relationship among the magnetic flux levels in the three legs of the three-leg core 6 is the same as observed during steady-state operation in which all the three phases are energized. Therefore, no transient components of magnetic flux are produced by energization of the second and third phases. Thus, the maximum magnetic flux level of 1.06 pu produced in the central leg by initial energization of the first phase is the maximum level of magnetic flux produced in the three-leg core 6 according to the aforementioned arrangement of the first embodiment.

Figure 5:
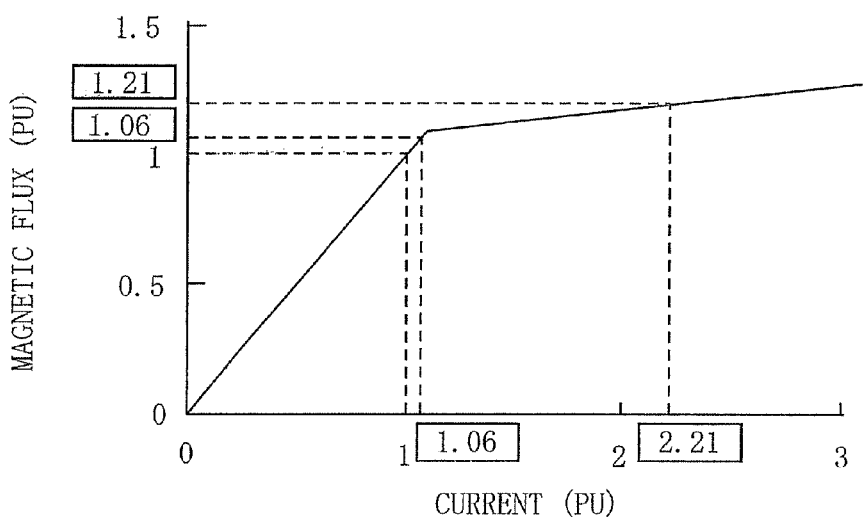
FIG. 5 is a diagram showing typical excitation characteristics of a reactor.

Although there is not so large a difference between the maximum magnetic flux level of 1.21 pu produced with the conventional switchgear control apparatus (FIG. 3) and the maximum magnetic flux level of 1.06 pu produced with the switchgear control apparatus of the present invention (FIG. 4), a considerable difference occurs in the amounts of currents flowing in the individual phases. This is because the reactor has nonlinear excitation characteristics as shown in FIG. 5. It can be seen from FIG. 5 that the maximum magnetic flux level of 1.21 pu produces approximately twice as large an inrush current as produced by the maximum magnetic flux level of 1.06 pu. It would therefore be appreciated that the switchgear control apparatus of the first embodiment serves to effectively suppress inrush currents which may occur when the three-leg core 6 is energized.

Second Embodiment

A second embodiment of the present invention, which is intended to permit a further understanding thereof, is concerned with the switchgear control apparatus operated in a manner different from the first embodiment in energizing the individual phases of the three-leg core 6.

Figure 6:
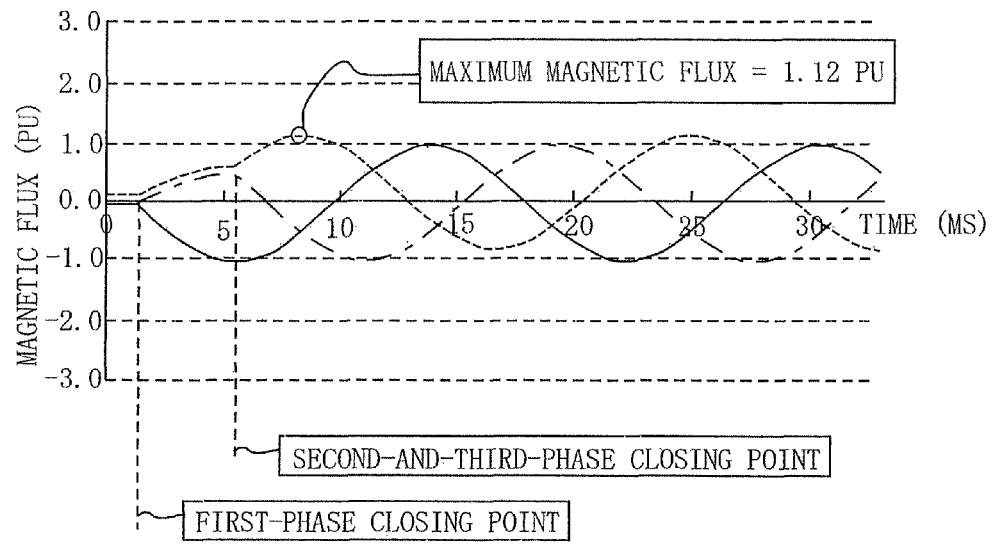
FIG. 6 is a diagram showing simulated magnetic flux waveforms of the individual phases at energization of the three-phase reactor according to a second embodiment of the invention.

FIG. 6 is a diagram showing an example of simulated magnetic flux waveforms of the individual phases at energization of the three-leg core 6 obtained when the first phase is energized at the same first-phase closing point and at the same level of residual magnetic flux in each phase as shown in FIG. 4 but when the second and third phases are energized at a point different from the seconds and-third-phase closing point shown in FIG. 4. In the example of FIG. 6, the second and third phases are energized at a zero-voltage point of the first phase a quarter cycle later than the first-phase closing point, during a period when DC components of the residual magnetic flux have not so attenuated. It is seen from FIG. 6 that the magnetic flux in the third phase reaches a maximum magnetic flux level of 1.12 pu which is higher than the maximum magnetic flux level of 1.06 pu in the first phase (FIG. 4) due to the influence of the aforementioned DC components of the residual magnetic flux.

The maximum magnetic flux level of 1.06 pu is not so high, however, compared to the maximum magnetic flux level of 1.21 pu (FIG. 3) occurring in the aforementioned conventional arrangement in which the magnetic flux produced in the first outer leg by energization of the first phase is unequally routed into the other two phases. This is because the first phase is the phase of the central leg of the three-leg core 6 in the example of FIG. 6 as in the first embodiment of FIG. 4.

Figure 7:
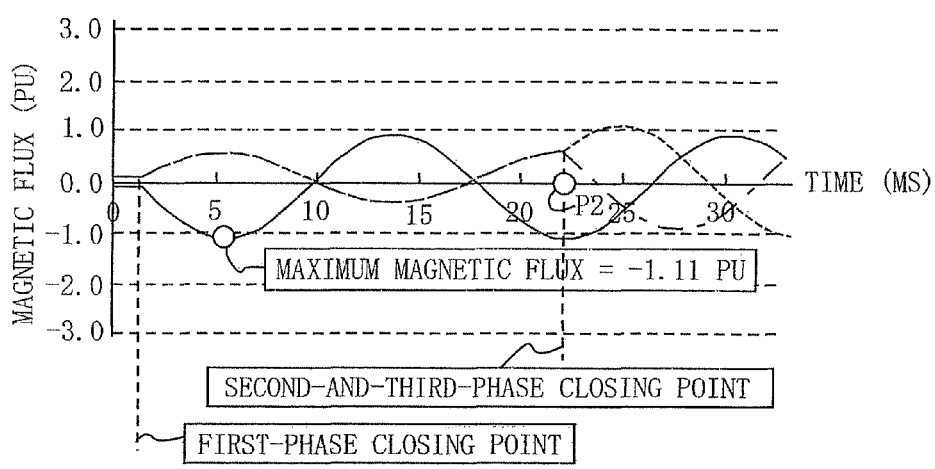
FIG. 7 is a diagram showing simulated magnetic flux waveforms of the individual phases at energization of the three-phase reactor in one variation of the second embodiment.

FIG. 7 is a diagram showing an example of simulated magnetic flux waveforms of the individual phases at energization of the three-leg core 6 in one variation of the second embodiment. In the example of FIG. 7, the first phase is the phase of the central leg of the three-leg core 6 as in the first embodiment of FIG. 4, however, the first phase is energized under different conditions from those of FIG. 4 at a point where the residual magnetic flux in the central leg is at a maximum level. As depicted in FIG. 7, the first phase is the phase of the central leg of the three-leg core 6, the second phase is the phase of the first outer leg of the three-leg core 6, and the third phase is the phase of the second outer leg of the three-leg core 6. Here, it is assumed that, residual magnetic flux in the first phase is −0.10 pu, residual magnetic flux in the second phase is +0.05 pu, and residual magnetic flux in the third phase is +0.05 pu.

In this case, the residual magnetic flux in the central leg of the three-leg core 6 carrying the first phase and magnetic flux increasing in the central leg as a result of application of the source voltage to the first phase have a common polarity (negative) and the residual magnetic flux has a high level, so that total magnetic flux in the central leg reaches a maximum magnetic flux level of −1.11 pu which is higher than the maximum magnetic flux level of 1.06 pu shown in FIG. 4.

It is understood from the above discussion that an inrush current in the first phase energized at first inevitably has a value determined by the residual magnetic flux in the first phase. However, since the first phase is the phase of the central leg of the three-leg core 6 in this invention, the magnetic flux produced in the central leg branches out in halves and is routed almost equally into the first and second outer legs. Accordingly, the example of FIG. 7 also exhibits the aforementioned effect of the present invention to suppress the maximum magnetic flux level, and thus the inrush currents, caused by energization of the other phases in substantially the same way as discussed with reference to the example of FIG. 6.

In summary, a switchgear control apparatus of the present invention controls contact closing action of a switchgear for connecting a three-phase reactor having a three-phase core to a three-phase power source. The switchgear control apparatus includes main contacts for first to third phases of the switchgear, operating mechanisms for the first to third phases having a capability to independently activate the main contacts for the individual phases, voltage sensors for detecting individual phase voltages of the three-phase power source, and a contact closing control circuit. The contact closing control circuit first outputs a contact closing signal to the operating mechanism for a first phase so that the main contact for the first phase corresponding to a central leg of the three-phase core is closed at a point in time of a first-phase voltage peak detected by the voltage sensor for the first phase and then outputs a contact closing signal to the operating mechanisms for second and third phases so that the main contacts for the second and third phases corresponding to two outer legs of the three-phase core are closed at a zero-voltage point of the first phase detected by the voltage sensor for the first phase according to a contact closing command.

In one aspect of the invention, the contact closing control circuit outputs the contact closing signal to the second- and third-phase operating mechanisms at a zero-voltage point of the first phase detected by the voltage sensor for the first phase at least one-half cycle later than close of the main contact for the first phase so that the main contacts for the second and third phases are simultaneously closed. Since the second and third phases are energized at least one-half cycle later than energization of the first phase, DC components of residual magnetic flux in the two outer legs of the three-phase core attenuate sufficiently after the main contact for the first phase is closed. This arrangement of the invention serves to suppress inrush currents at energization of the second and third phases in a reliable fashion.

In another aspect of the invention, the three-phase reactor includes the three-phase core which is a three-leg core with magnetic gaps created in the individual legs for the three phases as well as three-phase windings which are wound on the legs and joined together at a grounded neutral point. This arrangement ensures that magnetic flux produced in the central leg of the three-phase core by energization of the first phase branches out in halves and is routed almost equally into the two outer legs, so that residual magnetic fluxes in the second- and third-phase legs decrease.

Various modifications and alterations of this invention will be apparent to those skilled in the art without departing from the scope and spirit of this invention, and it should be understood that this is not limited to the illustrative embodiments set forth herein.

What is claimed is:

1. A switchgear control apparatus for controlling close operation of a switchgear for connecting a three-phase reactor having a three-phase core to a three-phase power source, said switchgear control apparatus comprising:

main contacts for individual phases of said switchgear;
   operating mechanisms for the individual phases having a capability to independently activate the main contacts for the individual phases;
   voltage sensors for detecting individual phase voltages of the three-phase power source; and
   a contact closing control circuit for first outputting a contact closing signal to the operating mechanism for a first phase so that the main contact for the first phase corresponding to a central leg of said three-phase core is closed at a point in time of a first-phase voltage peak detected by the voltage sensor for the first phase and then outputting a contact closing signal to the operating mechanisms for second and third phases so that the main contacts for the second and third phases corresponding to two outer legs of said three-phase core are closed at a zero-voltage point of the first phase detected by the voltage sensor for the first phase according to a contact closing command.

2. The switchgear control apparatus according to claim 1, wherein said contact closing control circuit outputs the contact closing signal to the second- and third-phase operating mechanisms at a zero-voltage point of the first phase detected by the voltage sensor for the first phase at least one-half cycle later than close of the main contact for the first phase so that the main contacts for the second and third phases are simultaneously closed.

3. The switchgear control apparatus according to claim 1, wherein said three-phase reactor includes said three-phase core which is a three-leg core with magnetic gaps created in the individual legs for the three phases as well as three-phase windings which are wound on the legs and joined together at a grounded neutral point.

* * * * *